Figure 2:
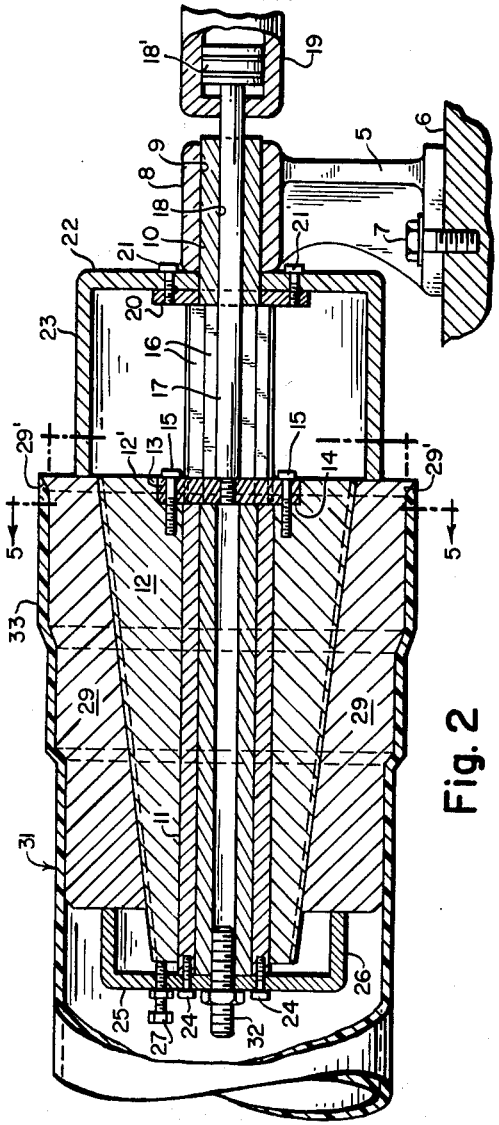

May 3, 1966

R. J. MILLS ETAL 3,248,756

EXPANDING DEVICE FOR PLASTIC PIPE

Filed June 15, 1965

2 Sheets-Sheet 1

INVENTORS
RICHARD J. MILLS
ELMER J. MARTI
BY *James N. Gee*
ATTORNEY

May 3, 1966  R. J. MILLS ETAL  3,248,756
EXPANDING DEVICE FOR PLASTIC PIPE
Filed June 15, 1965  2 Sheets-Sheet 2
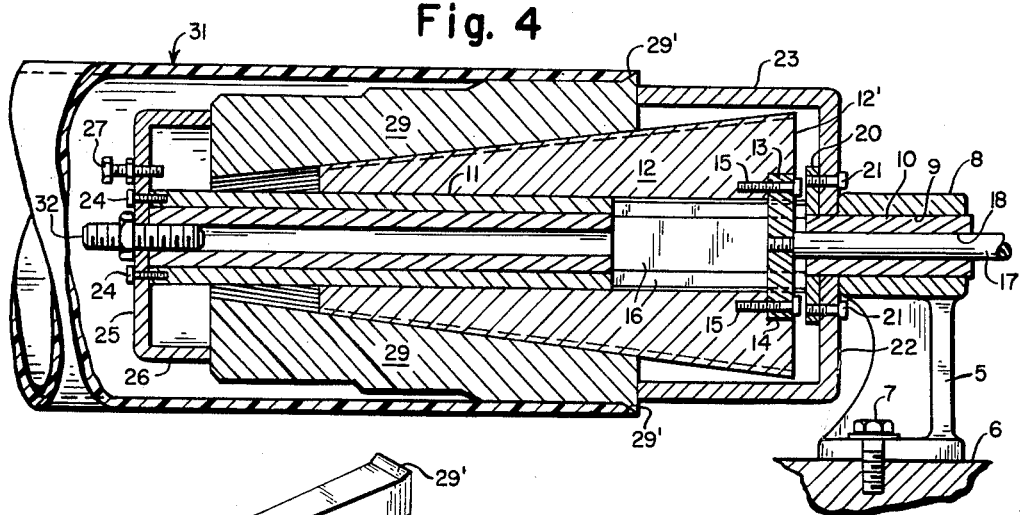
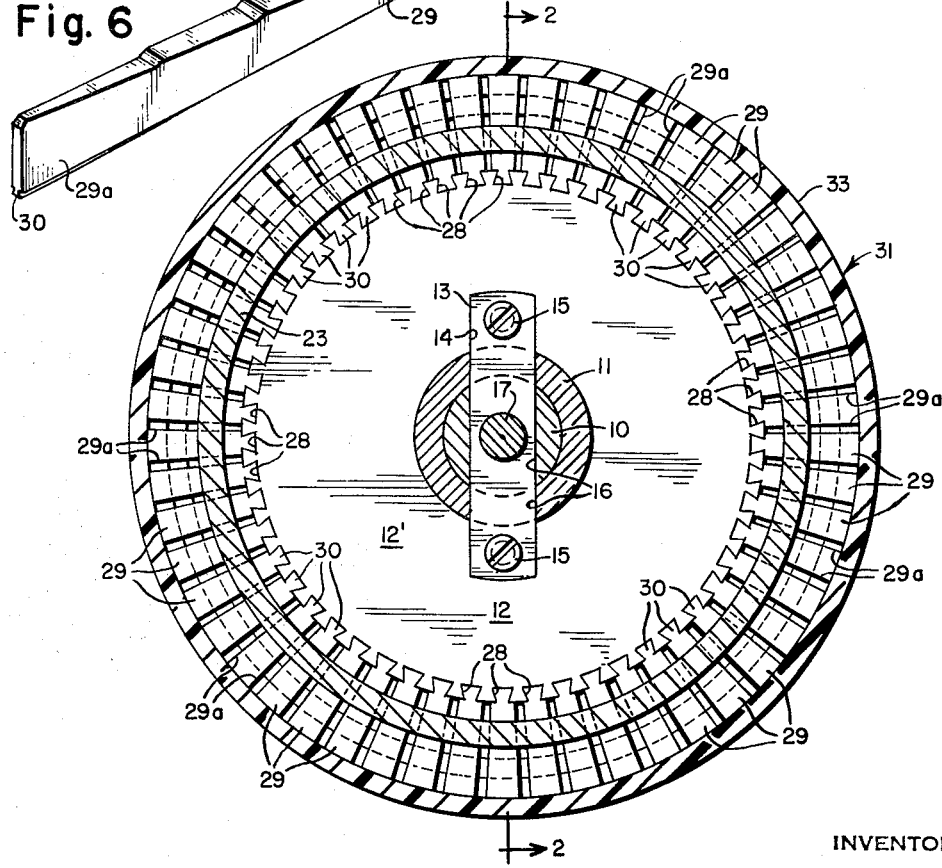
INVENTORS
RICHARD J. MILLS
ELMER J. MARTI
BY
ATTORNEY

United States Patent Office 3,248,756
Patented May 3, 1966

3,248,756
EXPANDING DEVICE FOR PLASTIC PIPE
Richard J. Mills, 600 NE. 14th Place, and Elmer J. Marti, 424 SW. 9th St., both of Fort Lauderdale, Fla.
Filed June 15, 1965, Ser. No. 464,181
6 Claims. (Cl. 18—19)

This invention relates to an expanding device for progressively expanding the end portion of a plastic pipe in order to form substantially a bell-end to the pipe to receive an interfitting pipe section to be cemented therein.

The invention comprises a conical body portion that is slidable toward and from an expanding position and with the body portion being provided with equidistantly spaced apart and longitudinally extending dovetail grooves for receiving a dovetail formed upon expanding segments and with the segments being held against longitudinal movement while the body portion is shifted back and forth.

The invention further comprises a tapered body having its surface longitudinally grooved to receive dovetails carried by a multiplicity of expanding segments and with the taper body portion traversing a cylindrical guide and with the taper being movable in opposite directions by a piston rod that is threaded into a plate that is recessed into and secured to the tapered body and whereby the tapered body causes the segments to move inwardly and outwardly under the influence of the piston rod and a second cylindrical tubular element concentric to the sleeve and with the second cylindrical element extending beyond the device to constitute a mounting means for the expanding element and with the several segments being held against shifting by cup-shaped cylindrical devices so that a piston rod may shift a tapered element within limits to cause the segments to contract or to expand and with the segments having their marginal edges stepped to receive a plastic pipe to be expanded and with means to limit the movement of the tapered element in both a contracting and expanding movement.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

Figure 3:
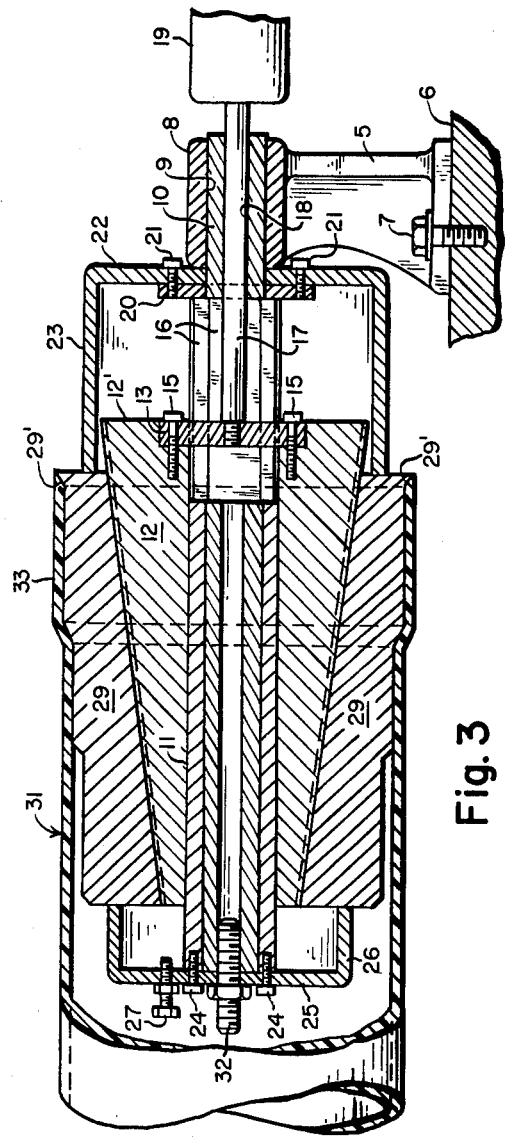
Figure 1:
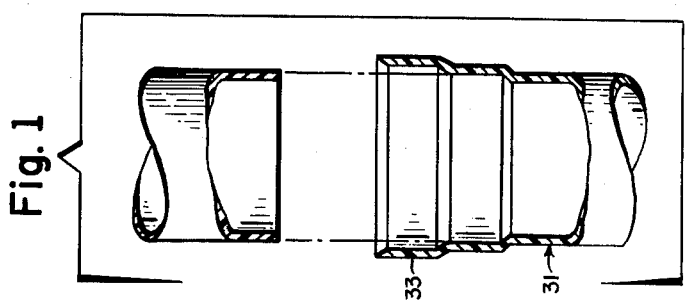

In the drawings:

FIGURE 1 illustrates companion pipe sections and with one section having been expanded for the reception of a companion pipe section, FIGURE 2 is a longitudinal section taken substantially on line 2—2 of FIGURE 5 and illustrating the device in a fully expanded position, FIGURE 3 is a similar view but with a plastic pipe being partially expanded, FIGURE 4 is a view similar to FIGURE 2 but with the device in the initial expanding position with respect to the plastic pipe, FIGURE 5 is a transverse section taken substantially on line 5—5 of FIGURE 2, and FIGURE 6 is a perspective view of one segment embodied in the device.

Referring specifically to the drawings, there has been illustrated a supporting bracket 5, having a base that is connected to any suitable surface, such as a workbench or the like, shown at 6 and bolted thereto as shown at 7. The bracket 5 has a cylindrical head 8 that is bored at 9 to receive a sleeve 10 and whereby the expanding device, to be described is supported in a horizontal manner upon the workbench 6.

Telescopic with respect to the sleeve 10 is a second sleeve 11, adapted to slidably receive a tapered element 12. Fixed to the wide end 12' of the element 12 is a plate 13, having fitment into recesses 14 of the taper 12 to be flush with the end of the taper and with the plate being fixed by upper and lower bolts 15. The sleeves 10 and 11 are slotted as indicated at 16 for the sliding movement of the plate 13 during the sliding movement of the taper movement 12. The plate 13, apertured and threaded to receive a threaded end of a piston rod 17, that passes through a bore 18 of the sleeve 10 and with the piston rod 17 being connected to a piston 18' that is slidable in a cylinder 19 under the influence of fluid or gaseous pressure. The sleeve 11 at one end carries a flange 20, that is bolted at 21 to the head 22 of a cup-shape cylindrical stop 23 and at the top end, the sleeve 11 is bolted at 24 to a head 25 of a cylindrical cup-shape limit stop 26. Also passing through the head 25 is an adjusting screw 27 for limiting the sliding movement of the taper 12 in one direction, while the taper is limited in its opposite direction by the flange 20.

The taper 12 see particularly FIGURE 5 is grooved longitudinally to form dovetail grooves 28, carried by segments 29, having dovetail ribs 30, for sliding engagement with the grooves 28. The segments 29 are shown more clearly in FIGURE 6 and the grooves 28 cause the segments 29 to be equidistantly spaced apart during the operation of the device and in actual practice, it is contemplated that 54 of the segments will be employed although it is to be understood no actual limit has been placed on the movement of segments employed. The segments are identical in shape and in size, having a radially inclined side 29a and with the top and bottom of each segment being transversely curved in accordance with the curvature of the taper 12 and the diameter of the pipe to be expanded. The segments 29 also taper longitudinally and, as spaced apart, permit the segments to be expanded by the movement of the taper 12 and when fully contracted by the taper, the segments will be relatively close together.

The pipe to be expanded is shown at 31 and in the fully contracted position of the taper 12, as in FIGURE 4, the pipe 31 may be easily slipped over the group of segments to be substantially flush. A bevel 29' formed on the several segments and in such position, the pipe 31 is frictionally engaged with the upper edges of all of the segments.

In the use of the device, the sleeves 10 and 11 are engaged as illustrated, with the sleeve 11 being fixed to a stop collar 26. The bore of the sleeve 10 has been threaded to receive a clamping screw 32 and the sleeve 11 bolted to the stop 26. The taper 12 is then engaged over the sleeve 11 and the plate 13 fixed thereto by the screws 15. The piston rod 17 is then connected to the plate 13 and the segments 29 having been engaged with the several grooves 28, the device is ready for operation however, before the device is used for expanding, the cup-shaped stop 23 is engaged and connected to the sleeve 11 by the screws 21. It will be apparent, that the stops 23 and 26 are of such diameter as to simultaneously engage the opposite ends of the segments 29, to securely hold the segments against shifting longitudinally. With the extended end of the sleeve 10 engaging the head 8, the entire device is fully supported upon the workbench 6 by the bracket 5. With the taper 12 in the position shown in FIGURE 4, a pipe section 31 is slipped over the segments 29 to the bevel 29' and the piston 18' is then energized to force the piston rod 17 inwardly to move the taper 12 upon the sleeve 11. As the piston 18' moves inwardly, it drives the taper 12 toward the cup 26 and to progressively expand the segments 29 against the inner wall of the pipe section 31, progressively expanding the pipe to form the bell-end 33 to a diameter equal to the original outer diameter of the pipe 31, and with the taper 12 being moved inwardly to a position against the stop screw 27, the segments 29 will have been fully expanded, forming a bell-end 33, such as illustrated in FIGURE 1. It should be understood of course that the end of the pipe 31 is initially heated to permit the full expansion of the segments and to stretch the pipe adequately to form the bell 33 for the insertion of the companion pipe section. With the pipe in the fully expanded position as shown in FIGURE 2, the piston 18 is reversed and the taper 12 moved in the opposite direction, causing the segments 29 to retract and to permit the pipe to be moved away from the expanding mechanism. The plate 13 is movable through the opposite slots 16 of the sleeve 11 and also moves through the opposite slots 10' of the sleeve 10. In the full retracting position of the taper 12, a large end of the taper has abutment with the flange 20 and when the taper is moved to the full expanding position, the small end of the taper has abutment with the adjusting screw 27.

It will be apparent from the foregoing that a very novel means has been provided to expand an end portion of a relatively large plastic pipe. The parts are simple, strong, durable and most effective as a means to readily expand the end of a plastic pipe and may be varied in size to expand various sizes of pipe. The segments 29 are held in accurate alignment with each other by the cups 23 and 26 and the multiplicity of segments 29 define a cylindrical body over which the pipe section is engaged.

It is to be understood that the invention is not limited to the precise construction shown, but the changes are contemplated as readily fall within the spirit of the invention as shall be determined by the scope of the subjoined claims.

We claim:

1. An expanding device of the character described for expanding the end portion of a plastic pipe to form a bell-end, the device embodying a conical body that is flat upon its opposite ends, cylindrical guide means for shifting the conical body in a horizontal direction, the conical body being provided upon its circumferential surface with a multiplicity of equidistantly spaced dovetail grooves, expanding blades having a dovetail upon their lower edges for riding engagement with respect to the dovetail slots, the several blades being radial, means to engage the opposite ends of the blades to maintain the blades against shifting longitudinally and whereby the conical body member causes the blades to move outwardly to an expanding position with respect to the pipe, the guide means including a pair of telescopic sleeves, a plate fixed to the large ends of the conical body, a piston rod connected to the plate and a cylinder having a piston that is connected to the piston rod and that is operable to shift the conical body to and from an expanding relation with respect to the blades, cups fixed to one sleeve at the smaller end of the conical body and with the cup at the opposite end being carried by a mounting bracket, the edges of the cups engaging the opposite ends of the blades, to maintain the blades against sliding movement during the movement of the conical body, the inner sleeve having an axial bore that is threaded at one end to receive a threaded bolt, the inner sleeve at its opposite end being mounted within the bore of a fixed bracket and with the piston rod passing through a bore of the inner sleeve to be connected to the plate.

2. The structure according to claim 1 wherein the dovetail grooves extend from end to end of the surface of the conical body, the guide sleeve for the conical body extending through the opening of the cup at one end of the device and having a flange that is bolted to a bottom of the adjacent cup and with both of the sleeves being slotted to permit the sliding movement of the plate during the movement of the conical body to and from an expanding movement with respect to the blades.

3. The structure according to claim 1 wherein the blades are shiftable outwardly under the influence of the conical body and guided in the movement by the dovetails and dovetail slots.

4. The structure according to claim 2 wherein the last named cup is cylindrical and having a closure wall and an open end, the diameter of the last named cup permitting the sliding movement of the dovetail body and with the open end of the cup bearing against the several blades to prevent the longitudinal movement of the blades and with the cup at the opposite end being cylindrical and having a closure wall and an open end and with a marginal end of the cup bearing against the opposite ends of the blades, the last named cup also being fixed to the outer sleeve and an adjusting screw carried by the last named cup and that limits the sliding movement of the conical body in an expanding direction.

5. An expanding device of the character described that comprises an inner mounting sleeve that is held at one end by a fixed supporting bracket and an outer sleeve overlying the inner sleeve and constituting a guide, the inner sleeve having an axial bore for the reception of a clamping bolt, the conical body upon its circumferential surface being provided with a multiplicity of equidistantly spaced dovetail grooves and a corresponding number of blades having dovetails upon their lower edges and that engage the grooves of the conical body, means at opposite ends of the device to engage the opposite ends of the blades and to maintain the blades against shifting longitudinally under the influence of the conical body, the conical body being connected to a piston rod and a cylinder and piston operative to shift the conical body in opposite directions to cause the several blades to be shifted simultaneously to and from and expanding position with respect to a plastic pipe and whereby to expand the pipe to form a bell-end thereon, the movement of the conical body in one direction by the piston rod causing all of the blades to move outwardly and with the blades being movable inwardly when the conical body is shifted in an opposite direction.

6. The structure according to claim 5 wherein the grooves of the conical body jointly taper from the large end to the smaller end and with the blades being generally wedge-shaped to permit the blades to move together when the conical body is shifted in a release position to carry the blades in an non-expanding position, each of the blades being identical and with their outer edges being stepped to form the bell-end on the plastic pipe, each of the blades being movable apart when the conical body is shifted to a release position to permit the blades to disengage an inner surface of the pipe, each of the blades at one end being provided with a bevel shoulder to constitute a limit means for engaging the plastic pipe in an expanding position.

References Cited by the Examiner

UNITED STATES PATENTS

| | | | |
|---|---|---|---|
| 220,651 | 10/1879 | Pagan | 72—155 |
| 1,698,999 | 1/1929 | Hothersall | 72—115 |
| 1,945,079 | 1/1934 | Riemenschneider | 72—115 |
| 1,995,485 | 3/1935 | Tormyn et al. | 72—355 |
| 2,672,175 | 3/1954 | Howard | 72—355 |
| 2,676,372 | 4/1954 | Venner et al. | 249—180 |
| 2,943,667 | 7/1960 | Ewing et al. | 72—115 |
| 3,169,276 | 2/1965 | Hugentabler. | |

FOREIGN PATENTS 699,249  12/1964  Canada.

WILLIAM J. STEPHENSON, *Primary Examiner.*